(12) United States Patent
Tarta

(10) Patent No.: US 7,827,438 B2
(45) Date of Patent: Nov. 2, 2010

(54) DISTRIBUTED TESTING SYSTEM AND TECHNIQUES

(75) Inventor: Mihail G. Tarta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 316 days.

(21) Appl. No.: 12/136,065

(22) Filed: Jun. 10, 2008

(65) Prior Publication Data

US 2009/0307530 A1     Dec. 10, 2009

(51) Int. Cl.
G06F 11/00     (2006.01)

(52) U.S. Cl. .............................. 714/4; 717/124; 714/38

(58) Field of Classification Search ........................ None
See application file for complete search history.

(56) References Cited

U.S. PATENT DOCUMENTS

| | | | |
|---|---|---|---|
| 5,325,518 A | 6/1994 | Bianchini, Jr. | |
| 5,371,883 A | 12/1994 | Gross et al. | |
| 5,544,310 A | 8/1996 | Forman et al. | |
| 6,505,342 B1 | 1/2003 | Hartmann et al. | |
| 6,604,209 B1 | 8/2003 | Grucci et al. | |
| 6,704,883 B1 * | 3/2004 | Zhang et al. | 714/4 |
| 6,810,364 B2 | 10/2004 | Conan et al. | |
| 7,058,953 B2 | 6/2006 | Willard et al. | |
| 7,401,259 B2 * | 7/2008 | Bhowmik et al. | 714/31 |
| 7,539,591 B2 * | 5/2009 | House et al. | 702/122 |
| 2004/0260982 A1 | 12/2004 | Bhowmik et al. | |
| 2005/0273675 A1 | 12/2005 | Rao et al. | |
| 2006/0212759 A1 | 9/2006 | Campbell et al. | |
| 2007/0124363 A1 * | 5/2007 | Lurie et al. | 709/202 |
| 2009/0307530 A1 * | 12/2009 | Tarta | 714/38 |

OTHER PUBLICATIONS

Bader, et al., "Testing Concurrency and Communication in Distributed Objects", 5th International Conference on High Performance Computing, 1998. HIPC '98, Date: Dec. 17-20, 1998, pp. 422-428.
Boy, et al., "Automated Testing of Distributed Systems", May 2004, pp. 1-10.
Ulrich, et al., "Test Architectures for Testing Distributed Systems", In: 12th International software quality week (QW'99), 1999, pp. 1-16.

* cited by examiner

*Primary Examiner*—Emerson C Puente
(74) *Attorney, Agent, or Firm*—Mayer & Williams PC

(57) ABSTRACT

A fully distributed system for testing a distributed computing system utilizes test services exposed in conjunction by independent test components deployed on one or more computing nodes of the distributed computing system. The test services ensure dynamic and adaptive coordination amongst the test components. The test services include but are not limited to: an atomic synchronization service; a distributed shared memory service; a lock manager service; a publish/subscribe service; and a producer/consumer service.

18 Claims, 4 Drawing Sheets

DISTRIBUTED TESTING SYSTEM AND TECHNIQUES

BACKGROUND

It is generally desirable to locate and correct defects that adversely affect the operation of software products. Some types of software products operate in distributed computing systems, which are homogeneous or heterogeneous computing systems that provide distributed access to data and/or computing functions/entities by multiple computing nodes, often in different locations. Examples of distributed computing systems include but are not limited to: Web searching services, file organization systems such as distributed databases, and enterprise computing systems.

Three models are often recognized for testing software products that operate in distributed system environments: (1) a global tester model that provides centralized test scenario management (for example, global state management and test scenario execution and control) for distributed system entities; (2) a global tester model that provides partially centralized test scenario execution and control; and (3) a distributed tester model having multiple, distributed, independent test components that dynamically agree on test scenario management, execution, and control.

Although the distributed tester model has benefits in the areas of scalability, efficiency, and ease of integration, it has been difficult to provide a testing methodology that ensures dynamic and adaptive coordination amongst distributed test components that execute distributed test scenarios.

SUMMARY

A modular, extensible, and reusable distributed testing system, and techniques for testing distributed computing systems, are discussed herein.

In an exemplary implementation, a distributed computing system under test ("DSUT") is implemented using a service-oriented architecture that includes a hierarchy of system components. In an exemplary scenario, the system components include: at least two computing nodes in one or more locations; one or more similar or dissimilar sets of computer-executable instructions, structured as software modules and referred to as "processes," which are deployed on and/or accessible by one or more computing nodes to provide certain predetermined functionality (examples of functionality include but are not limited to Web searching, distributed or clustered database management, or heterogeneous data center functions such as Web hosting, email, and the like); one or more service-providing entities exposed by the one or more processes; and various internal or external computing resources such as files, data, objects, and the like, which are accessible via the processes and/or service-providing entities.

An exemplary distributed testing system having independently executable components operable to access the hierarchy of system components of the DSUT is likewise implemented using a service-oriented architecture. In an exemplary scenario, the distributed testing system components include: one or more similar or dissimilar sets of computer-executable instructions, structured as software modules and referred to as "test components," which are deployed on one or more of the computing nodes of the DSUT to independently perform test scenarios; and a number of service-providing entities, referred to as "test services," which are exposed in conjunction by the test components and are configured and controlled via certain defined interfaces discussed herein. Exemplary test services discussed herein include: an atomic synchronization service; a lock manager service; a publish/subscribe service; a distributed shared memory service; and a producer/consumer service. The test services enable implementation of a fully distributed tester methodology, while ensuring dynamic and adaptive coordination amongst distributed test components that execute the distributed test scenarios.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DRAWINGS

DETAILED DESCRIPTION

Distributed testing systems and techniques for testing distributed computing systems are discussed herein. Certain test services are defined and deployed in a fully distributed testing system to ensure dynamic and adaptive coordination amongst distributed test components that execute distributed test scenarios.

Figure 1:
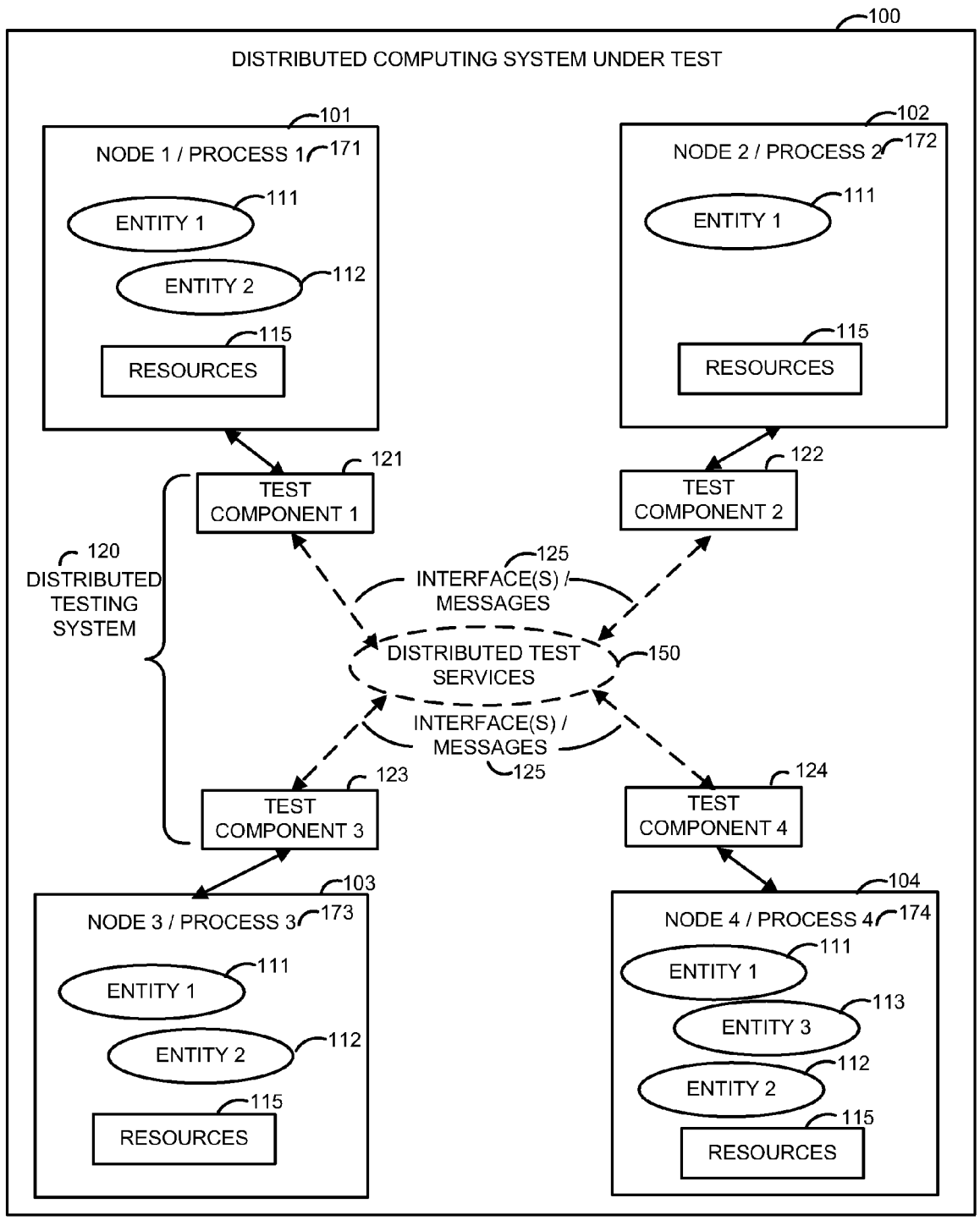
FIG. 1 is a block diagram illustrating certain components of an exemplary distributed computing system under test ("DSUT") and certain components of a distributed testing system for testing the DSUT.

Turning to the drawings, where like numerals designate like components, FIG. 1 is a simplified block diagram illustrating certain components of an exemplary distributed computing system under test ("DSUT") 100 and certain components of a distributed testing system 120 for testing the DSUT.

Generally, DSUT 100 is composed on N nodes (four shown, 101, 102, 103, and 104, respectively), each node hosting M processes (four shown, 171, 172, 173, and 174, respectively) comprising one or more similar or dissimilar sets of computer-executable instructions structured as software modules, each process exposing P service-providing entities (three shown, 111, 112, and 113) that perform services for client applications. It will be understood that the nature of the services provided by the processes may be homogeneous (for example, distributed or clustered databases) or heterogeneous (for example, a datacenter composed of Web servers/services, email servers/services, and database servers/services.) Various internal or external computing resources 115 such as files, data, objects, and the like, which are accessible via nodes 101, 102, 103, and 104, processes 171, 172, 173, and 174, and/or service-providing entities 111, 112, and 113 are also shown. The nodes, processes, service-providing entities and resources are uniquely addressable (for example, via names or ids or any other suitable direct or indirect addressing technique). Each service-providing entity 111, 112, and 113 may be replicated across nodes, with each entity being represented by a replica set (not shown) with a primary replica and one or more secondary replicas. Generally, each entity has a primary replica available within DSUT 100 when a quorum of nodes is up (one exemplary quorum is assumed to be four for discussion purposes, although any desired quorum may be selected).

Figure 2:
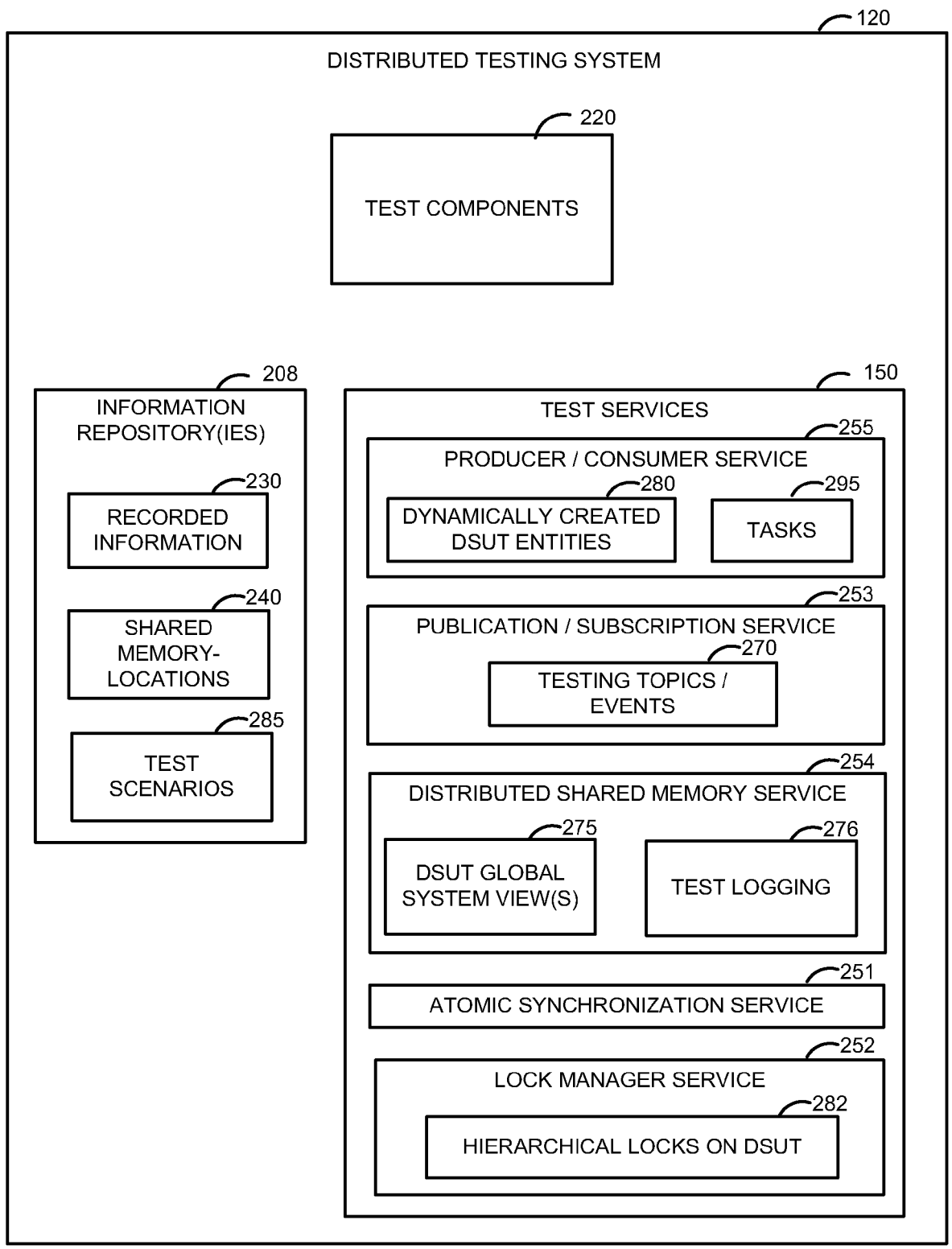
FIG. 2 is a block diagram illustrating certain aspects of the distributed testing system shown in FIG. 1.

Distributed testing system 120 implements a fully distributed tester methodology, and as shown includes (but is not limited to) the following testing system components: test components 121, 122, 123, and 124, which are one or more similar or dissimilar sets of computer-executable instructions, structured as software modules and deployed on one or more of the N nodes (as shown, nodes 101, 102, 103, and 104, respectively) to independently execute test scenarios (test scenarios 285 are shown and discussed further below in connection with FIG. 2); and a number of distributed test services 150, which are service-providing entities (deployed on one or more of the N nodes, or on a separate node) exposed in conjunction by the test components during execution of the test scenarios, to ensure dynamic and adaptive control amongst test components 121, 122, 123, and 124. It will be understood that more than one instance of a particular test service may be deployed within the distributed testing system. Distributed test services 150 (which may also be referred to herein as "test services" 150) are configured and controlled via certain defined interfaces/messages 125 (discussed in connection with FIGS. 2 and 3).

With continuing reference to FIG. 1, FIG. 2 is a block diagram illustrating certain aspects of distributed testing system 120 in more detail. As shown, distributed testing system 120 includes: test components 220; test services 150 (including: producer/consumer service 255, with which dynamically created DSUT entities 280 and tasks 295 are associated; publication/subscription service 253, with which testing topics/events 270 are associated; distributed shared memory service 254, with which DSUT global system view(s) 275 and test logging 276 are associated; atomic synchronization service 251; and lock manager service 252, with which hierarchical locks on DSUT 282 are associated); and information repository(ies) 208, which store computer programs and information associated with test components 220 and/or test services 150 (including: recorded information 230 associated with operation of test components 220; distributed test scenario(s) 285 executed by test components 220; and shared memory locations(s)).

Test components 220, which collectively represent computer-executable instructions that form one or more of the test components 121, 122, 123, and 124 shown in FIG. 1, are responsible for performing a predetermined set of operations in connection with the independent execution of one or more test scenarios 285. A number of test services 150 are exposed in the performance of the operations. The term independent as used herein refers to the fact that there is no central test coordinator—certain shared resources may be accessed, such as shared memory 240 (discussed further below), although even shared resource access is limited. Generally, a particular test scenario 285 represents workload of DSUT 100 that is performed and/or monitored by a particular test component with respect to a particular component of DSUT 100, to verify the behavior of DSUT 100 or a portion thereof (such as a particular node, process, service-providing entity, or resource state). In one exemplary scenario, M copies of the same test component 220 are configured to run on individual nodes N of DSUT 100, with M<=N. Generally, the number of test components 220 running against DSUT 100 is not greater than a given percentage of the number of nodes N in the DSUT, so that each test component 220 is configured to make progress when running against DSUT 100. It may be desirable to satisfy a distributed condition specifying that a particular test component 220 only executes when all of the test components running against the DSUT are also executing (for purposes, among other things, of: ensuring initialization or cleanup of each test component; ensuring that each test component has checked local or global system invariants; and ensuring test component agreement before starting distributed test execution).

An exemplary set of operations performed by a particular test component 220 is as follows (note that the set of operations is also shown and discussed further below in connection with FIG. 3): initialize/synchronize test components running against the DSUT; identify a candidate system component of the DSUT for take-down (for example, a node, process, service-providing entity, or resource that is not taken down yet by any other test component); take-down the candidate system component; re-start the candidate system component; perform a test scenario; and locally perform verification of performance of the DSUT or a portion thereof. Performing verification includes but is not limited to actions such as analyzing information gathered pursuant to test scenario performance, and making pass/fail determinations based on the analysis.

Referring again to distributed testing system 120 shown in FIG. 2, test services 150 represent software components in the form of service-providing entities that enable implementation of a fully distributed tester methodology using a distributed systems patterns approach, while ensuring dynamic and adaptive coordination amongst test components 220 that execute test scenarios 285. Test services 150 are independently called with parameters by test components 220 via interfaces/messages 125 (shown in FIG. 1). One or more individual test services 150 may be deployed on one or more of the M nodes of DSUT 100 on which test components 220 are configured to run, or on one or more different nodes of DSUT 100.

Atomic synchronization service 251 uses an atomic synchronization object (not shown) to implement synchronization points with atomic behavior (that is, all-or-nothing behavior, for example, when it is desirable for a test component not to execute unless all the test components running against the DSUT are also executing); to enable test components 220 to establish a common initial state (for example, to ensure that each test component is initialized and has checked local or global system invariants) prior to execution of test scenarios 285; to implement a state of quiescence for the DSUT that is useful for validation and verification purposes; and to facilitate coordinated (generally unexpected) termination of a distributed test scenario (for example, if one or more test components fail to reach the synchronization point-terminating abruptly or because of failed verification—the other test components may also decide to terminate).

The exemplary interfaces below, presented in pseudo-code form, may be provided by atomic synchronization service 251 and the atomic synchronization object. Each test component 220 would make calls to the atomic synchronization service using the atomic synchronization object. The synchronization object is atomic in the sense that if at least one test component fails to join, all the other test components will know that by receiving an exception back from the synchronize call. It is counted so any call beyond the limit will fail (and that no other test component can later succeed at acquiring this synchronization object—once it is failed it stays failed), telling a test component that it has to shutdown since there is no work allowed for it (in the exemplary scenario, at maximum 4 test components can execute). This ensures agreement on starting distributed test execution, and is a way of ensuring progress by not allowing too many test components to start.

```
IAtomicSyncrhonizationObject =
IAtomicSynchronizationObjectFactory.
        CreateAtomicSynchronizationObject("DSTS/Initialization", //
        logical name for the synchronization workspace 4); // number of
test components, which for exemplary purposes is equal to the number
of nodes (4)
IAtomicSyncrhonizationObject.Synchronize(initialStateTimeout); // wait
for all test components to join
IAtomicSynchronizationObjectFactory.DestroyAtomicSynchronization-
        Object("DSTS/Initialization");
namespace SynchronizationService
{
    // Factory interface used for atomic synchronization of test
    components.
    public interface IAtomicSynchronizationObjectFactory
    {
        // Creates a synchronization object with the given named
        // workspace and with the given participant count.
        /* out */ IAtomicSynchronizationObject
CreateAtomicSynchronizationObject(
            /* in */string synchronizationWorkspaceName,
            /* in */int participants);
        // Destroys the synchronization object with the given name
        void DestroyAtomicSynchronizationObject(
            /* in */string synchronizationWorkspaceName);
    }
    // Atomic synchronization interface
    public interface IAtomicSynchronizationObject
    {
        // Performs a synchronization operation planned to expire after
        // the given timeout. If the timeout occurs, all participants will be
failed in this synchronization
        // operation. If all participants join within the given timeout, the
synchronization is
        // considered successful.
        void Synchronize(/* in */ int timeout);
    }
}
```

In order to perform verification, the DSUT is generally brought to a quiescent state. To achieve the quiescent state, each test component 220 may utilize atomic synchronization service 251 and atomic synchronization object in performing the following call sequence (illustrated in pseudo-code form) after it has stopped activity against the DSUT:

```
{STOP ACTIVITY AGAINST THE DSUT}
IAtomicSyncrhonizationObject =
IAtomicSynchronizationObjectFactory.
        CreateAtomicSynchronizationObject("DSTS/QuiesceStart", //
        logical name for the synchronization workspace 4);
IAtomicSyncrhonizationObject.Synchronize(qStartStateTimeout); // wait
for all test components to join
{PERFORM VERIFICATION} // at this point all test components have
stopped their activity against the system
IAtomicSyncrhonizationObject =
IAtomicSynchronizationObjectFactory.
        CreateAtomicSynchronizationObject("DSTS/QuiesceEnd", //
        logical name for the synchronization workspace 4);
IAtomicSyncrhonizationObject.Synchronize(qEndStateTimeout); // wait
for all test components to join
{RESUME ACTIVITY AGAINST THE DSUT}} // at this point all test
components have performed their verification of the system
IAtomicSynchronizationObjectFactory.
        DestroyAtomicSynchronizationObject("DSTS/ QuiesceStart");
IAtomicSynchronizationObjectFactory.
        DestroyAtomicSynchronizationObject("DSTS/ QuiesceEnd");
```

Referring again to test services 150 shown in FIG. 2, lock manager service 252 implements hierarchical locks on DSUT 282 for hierarchically-defined candidate system components (for example, nodes, processes, service-providing entities, and/or resources), to facilitate coordination amongst test components 220 for taking down such system components, controlling access to DSUT components, or test-created components. While each test component 220 runs on a particular node of the DSUT, that should not generally prevent a given test component from attempting to take down/access any of the system components associated with other nodes. An exemplary test coordination algorithm utilizing lock manager service 252 is as follows: if a system component is used for test scenario execution, it is locked in shared mode; if a system component is chosen to be taken down, it is locked in exclusive mode. As such, more than one test component can use the same system component for test scenario execution, but only one test component at a time can take the system component down, which eliminates test failure potential.

An exemplary locking scheme implemented by each test component 220 is as follows: prior to taking down a system component (referred to for exemplary purposes as a process), the test component attempts to acquire an exclusive lock on that process from lock manager service 252. In the context of DSUT 100, for example, when a test component 220 selects a candidate system component to take down (for example, process 1 171 on node 1 101), before actually performing the operation of taking down the process, it will call lock manager service 252. If lock manager service 252 grants the exclusive lock request, then no other test component owns the process and it is safe for the calling test component to take ownership of that process. Once a process is successfully exclusively locked and taken down, identifying information (such as the process name and/or address) is stored in the local state of the test component, and usable at a later time, such as when it is time to bring the process back up. After the process is successfully taken down, it is brought back up. If lock manager service 252 denies the exclusive lock request, then the test component continues its execution by attempting to acquire an exclusive lock on another process.

Each time a test component successfully exclusively locks a process, it may be desirable to notify the other test components (via a broadcast message or via publication/subscription service 253 (discussed further below), for example), identifying the process that has been locked, when the process was taken down, and when the process was brought back up. To determine which processes are current candidates for taking down, test components may then eliminate from the list of all known processes the ones that are still down based on the notifications. Of course, there is no guarantee that a particular candidate process is currently available for take-down (because just as one test component finds it, another one may have found it too and taken it down), but notification can narrow down the list of candidate processes. This technique ensures efficiency when selecting candidate processes, and therefore progress of test components even in the case of a large-scale, very dynamic DSUT. Lock manager service 252 also facilitates use of other techniques. For example, lock count boundaries may be established via lock manager service 252 (such as lower limits on shared resource access (one application being semaphore emulation) and/or upper limits on lock waiting queues (one application being test workload throttling). In another example, maintaining a lock history for a particular entity enables the development of distributed test components that learn from and adapt to the behavior or previously executed distributed test components/scenarios. In a further example, the efficient debugging and tracing of distributed test components/scenarios that execute concurrently and are in conflict (attempting to user the same locking entities at the same time) is enabled.

Assuming all test components 220 use for locking purposes the same hierarchical system component naming convention, there will be no conflict amongst the test components and coordination is accomplished. There may be multiple active locking hierarchies used concurrently, although all test components being part of the same distributed test scenario would use the same hierarchy. System components are also referred to herein generically as "resources," as it will be understood that the generic term resources encompasses resources 115 as described herein as well as other components of DSUT 100. As such, a system component name used in the context of the locking service is generally a logical and hierarchical name, similar to a URL structure, enabling test components to identify the system component in a more targeted way, reducing contention in test scenarios, and being user friendly. With pre-defined system component hierarchies, this feature also enables distributed test coordination across test components developed at different times in the product cycle and by different owners.

One exemplary call sequence for implementing the exemplary locking scheme using lock manager service 252, is as follows:

```
ILockManagerService = ILockManagerFactory. CreateLockManager(
    ISponsor,
    <test-component-identification-guid>,
    "DSTS/ProcessActivity",
    "ProcessActivityLockResource");
ILockResource = FromString("DSTS/Node=1/Process=1/");
LockResult = ILockManager.Lock(
    <test-component-identification-guid>,
    ILockResource,
    Exclusive,
    lockTimeout);
if (LockResult.lockStatus == LockStatus.Success)
{
    // found process and own it at this time
    {PROCEED TO TAKE PROCESS 1 ON NODE 1 DOWN}
}
else
{
    // attempt to find another process candidate, since this process is
    // already owned by a different test component
}
```

One exemplary call sequence usable by a particular test component 220 for bringing back up a successfully locked process using lock manager service 252, is as follows:

```
{BRING PROCESS 1 ON NODE 1 BACK - RESTART}
ILockResource = FromString("DSTS/Node=1/Process=1/");
ILockManager.Unlock(
    <test-component-identification-guid>,
    ILockResource,
    Exclusive); // this is passed in only for consistency checks
```

An exemplary interface provided by lock manager service 252 is presented below, in pseudo-code form.

```
namespace LockManagerService
{
    // Factory interface used to create lock manager objects.
    public interface ILockManagerFactory
```

-continued

```
    {
        // Returns a lock manager object with the given name. The Lock
manager accepts
        // custom lock resources with their own custom lock conflict
table to work with. The
        // the client passes in a lifetime interface that the lock
manager can use to detect
        // if the client is still alive. If the client shuts down, the
lock manager has the choice
        // of automatically releasing that client's locks. The
reason for this behavior is that
        // the test components have to make progress, so one client
cannot indefinitely hold
        // locks, and sometimes the test components know apriori that
one test component
        // might go away because of the operations it is performing
(i.e. network disconnect).
        /* out */ ILockManager CreateLockManager(
            /* in */ ISponsor clientLifetimeSponsor,
            /* in */ Guid lockManagerClient,
            /* in */ string lockWorkspaceName,
            /* in */ string lockResourceTypeName,
            /* in */ bool cleanupDeadClientLockResources);
    }
    // Accepted lock modes.
    public enum LockMode
    {
        Shared,         Exclusive,
        Create,         Drop,
        Empty,
        IntentShared, // lock manager internal use only
        IntentExclusive // lock manager internal use only
    }
    // Status values for lock acquisition requests.
    public enum LockStatus
    {
        Success,        Timeout,
        Failed,         Waiting,
    }
    // Status values for lock release requests.
    public enum UnlockStatus
    {
        Success,
        Failed,
        UnknownClient,
        UnknownLockResource,
    }
    // A lock acquisition request is returned a lock status and a history
of predefined length
    // of all successful lock request on that resource. This test specific
behavior allows test
    // components to learn, opening the door to building
    // dynamic and adaptable tests based on past executions/operations.
    public class LockResult
    {
        public LockStatus lockStatus = LockStatus.Failed;
        public IList<LockMode> previousLockModes;
    }
    public class UnlockResult
    {
        public UnlockStatus unlockStatus = UnlockStatus.Failed;
    }
    // Encapsulates functionality for parsing a lock resource name
(hierarchical).
    public interface ILockResourceName
    {
        /* out */ IList<string> LockResourceNameParts { get; }
    }
    // Interface to the lock compatibility/conflict table for the specific lock
resource.
    public interface ILockModeOperations
    {
        // Returns true if the lock already granted to a test component and
the lock newly
        // requested by another test component are compatible, therefore
grantable concurrently.
        /* out */ bool Compatible(
            /* in */ LockMode lockModeRequested,
            /* in */ LockMode lockModeGranted);
```

-continued

```
}
// A lock resource is made up of a lock resource name and its conflict
table. This functionality is specific to each test scenario. Each test scenario
that requires a new way to interpret an existent lock resource or create a
completely new lock resource, would need to define a class that
implements this interface. This lock resource is known and common to all
test components of that distributed test scenario
    public interface ILockResource : ILockResourceName,
    ILockModeOperations
    {
    }
// Lock manager interface.
public interface ILockManager
{
        // Executes a lock request for a named resource with the given
lock mode and
        // expecting to wait for that resource at most for the given timeout.
        /* out */ LockResult Lock(
            /* in */ Guid lockClient,
            /* in */ ILockResource lockResource,
            /* in */ LockMode lockMode,
            /* in */ int lockTimeout);
        // Unlocks a previously successfully locked resource.
        /* out */ UnlockResult Unlock(
            /* in */ Guid lockClient,
            /* in */ ILockResource lockResource,
            /* in */ LockMode lockMode);
    }
}
```

Referring again to test services 150 shown in FIG. 2, publication/subscription service 253 implements a topic-based publication/subscription messaging paradigm, providing test components 220 with access to testing topics/events 270 to facilitate distributed control and state information sharing of various test component/test scenario behaviors (including termination thereof). Publication/subscription service 253 and testing topics/events 270 can be used to communicate any type of event of interest to testing components. One use of publication/subscription service 253 is facilitating the ability of test components 220 to efficiently find system components (assumed to be processes for discussion purposes) that are candidates for take-down (for example, when a current lock request has been denied by lock manager service 252, as described above). For example, a "lock history" topic may be established, to which test components 220 may publish events. Test components that have subscribed to receive events published to the lock history topic will receive notification (for example, asynchronous callbacks from publication/subscription service 253) as new events are published to the lock history topic by other test components. Thus, each test component has in its queue a list of processes that were previously taken down and brought up successfully. Another use of publication/subscription service 253 is communication of unexpected exceptions encountered by test components 220, to enable test termination as close as possible to the fault(s) encountered. Another use is the following: imagine a publisher that cares to know that all of its current subscribers are alive, and received the last event sent (be that event a proper event that includes data, or just a data-less heartbeat event). The publication/subscription service can return this information, so the publisher can choose to terminate itself or its publication if at least one subscriber is dead and has not received the last event published, or inform the rest of the alive subscribers of that dead subscriber.

An exemplary interface provided by publication/subscription service 253 is presented below, in pseudo-code form.

```
namespace PublishSubscribeService
{
    // Root event class to publish or subscribe to.
    [Serializable]
    public abstract class PublishSubscribeEvent : EventArgs
    {
        // Topic of the event. This field has to match the publication topic.
        public abstract string topic { get; }
        // Data of the event (any serializable class derived from object and
part of the .Net Framework).
        public abstract object data { get; }
    }
    // Base event class to publish or subscribe to.
    [Serializable]
    public class BaseEvent : PublishSubscribeEvent
    {
        // Constructor.
        public BaseEvent(string topic, object data);
        // Override from root class.
        public override object data { get { return eventData; } }
        // Override from root class.
        public override string topic { get { return eventTopic; } }
        // Holds the event topic name.
        protected string eventTopic;
        // Holds the event data.
        protected object eventData;
    }
    // Event that signals when a subscriber of the topic goes away.
    [Serializable]
    public class SubscriberStopEvent : BaseEvent
    {
        // Constructor.
        public SubscriberStopEvent(string topicFailed)
            : base(topicFailed, null);
        // Exception encountered when the subscriber is not available
        to receive an event.
        public PublishSubscribeException exceptionInformation;
    }
    // Event that signals when a publication goes away.
    [Serializable]
    public class PublicationStopEvent : BaseEvent
    {
        // Constructor.
        public PublicationStopEvent(string topicFailed)
            : base(topicFailed, null);
    }
    // Used to check if the publication is still alive.
    [Serializable]
    public class HeartbeatEvent : BaseEvent
    {
        internal static string HeartbeatTopic = "HeartbeatTopic";
        // Constructor.
        public HeartbeatEvent( )
            : base(HeartbeatEvent.HeartbeatTopic, null);
    }
        // Callback interface used to notify a subscriber that an event
of interest has occurred.
        public delegate void
        SubscriptionHandler(/* in */ BaseEvent remoteEvent);
        // Publication interface. It is the method of emitting test
events for the interested test components.
        public interface IPublication
        {
            // Publish a test event. If the publication is not failed,
            it returns true.
            /* out */ bool Publish(/* in */ BaseEvent remoteEvent);
            // Dynamically join a topic of interest. This enables test
components to become interested
            // of events produced by other test components at any point in
time during the test           // scenario execution, as opposed to apriori.
            void Subscribe(/* in */ Guid subscriber,
    /* in */ SubscriptionHandler remoteCallback);
            // Dynamically unsubscribe from a topic of interest.
            void Unsubscribe(/* in */ Guid subscriber);
        }
        // Interface to create publications for specific topics.
        public interface IPublicationFactory
        {
            // Create a publication with a given topic name (subject
```

-continued

```
of interest). A publication can
        // be created in such a way that if any of its subscribers fails, the
publication also fails.
        /* out */ IPublication CreatePublication(
            /* in */ string topic,
            /* in */ bool failPublicationOnSubcriberFailure);
    }
}
```

Referring again to test services 150 shown in FIG. 2, distributed shared memory service 254 implements a multiple-reader, multiple-writer memory model for state sharing (for example, shared test logging 276 by test components 220, and construction of DSUT global system views 275 from partial, local views of individual test components 220), which provides the ability to work on and with distributed test objects as if they were local, enables simple distributed pass/fail test condition termination, enables easier development of multi-threaded test components since concurrency of conflict is solved implicitly by this service, and simple integration and/or development of distributed test components 220 and test scenarios 285. Generally, each test component 220 retrieves all replicas of service-providing entities from the local node where it is running, and sends the replica set to a named object (for exemplary purposes referred to herein as the "DSTS partial system view" object) in distributed shared memory service 254. This object is written by each test components with its respective partial system view, and can have a method on it (for exemplary purposes referred to herein as the "validate" method) that will construct a global system view 275 from each of the partial system views sent by each test component. After all of the test components have submitted partial system views, the "validate" method is called by each test component, and will put together all replica sets for each test component, and verify the existence of at most one primary replica for each service-providing entity. If the "validate" method finds at least two primary replicas for each service-providing entity, then it may be desirable to terminate all test components in error and produce a failure of the distributed test scenario.

An exemplary interface provided by distributed shared memory service 254 is presented below, in pseudo-code form.

```
namespace DistributedSharedMemoryService
{
    // Factory interface for creating distributed shared memory test objects.
    public interface I DistributedSharedMemoryFactory
    {
        // Creates a distributed shared memory object with the given
        // name. A distributed shared memory object is found to be
        // created as a bag of properties and values.
        /* out */ IDistributedSharedMemory
CreateDistributedSharedMemoryObject(
            /* in */ string sharedMemoryWorkspaceName);
    }
    // Interface for set/get operations against the distributed shared
    memory test object
    public interface IDistributedSharedMemory
    {
        // Read the values of properties
        /* out */ object Read(/* in */ object properties);
        // Set the values of properties
        void Write(/* in */ object mapPropertiesToValues);
        // Validate state of distributed shared memory test object
        void Validate( );
    }
}
```

Referring again to test services 150 shown in FIG. 2, producer/consumer service 255 hosts tasks 295 that contain information (in the form of service-providing entities 280) about dynamically created DSUT entities 280 created (and deleted) in the DSUT—the named task bag workspace is usable by test components 220/test scenarios 285 to react to dynamic state or behavior changes of the DSUT, and to perform workload adaptation in long-running test scenarios. Each time a particular test component 220 dynamically creates a service-providing entity 280, it also could produce an initial task 295 containing the entity address and information via the producer/consumer service 255, and the existence of the created service-providing entity 280 is guaranteed until the task execution is completed. At that time, the other test components can notice the newly created entity by querying for new tasks of a certain type created in the producer/consumer service and could become consumers of those tasks. Eventually, the service-providing entity 280 may be deleted. The consumer of the initial task may decide also if new tasks are to be introduced in the DSUT as a follow-up to the initial task (each test component 220 can asynchronously place tasks to be executed into the DSUT, and when certain conditions occur, those tasks are picked up by the same or other test components in order to produce results or new tasks, that later find their way into the DSUT through the same mechanism.) Exemplary information within a particular task 295 includes but is not limited to: the task type; its relative priority; the producer system component that produced it; the consumer system component that worked on it; the results given by that task's execution (which themselves may in turn be new tasks); and a serializable bag of properties and values.

For example, assuming that one test component 220 (the producer test component) selects process 1 171 on node 1 101 in DSUT 100 to dynamically create a new service-providing entity 280. The following pseudo-code may be used by producer test component to dynamically create a new service-providing entity 280 ("entity 3"):

```
ITaskManager =
ITaskManagerFactory.CreateTaskManager("DSTS/EntityActivity");
Task task = new Task( );
task.taskType = "EntityCreated";
task.producer = <test-component-identification-guid>;
task.bag["location"] = "DSTS/Node=1/Process=1/Entity=3/";
task.bag["operations"].Add("Read");
task.bag["operations"].Add("Write");
ITaskManager.AddTask(
        <test-component-identification-guid>,
        task,
        defaultTaskProcessingTimeout);
```

After creation of "entity 3", the test component will post an initial task 295 associated with the entity to the other test components.

Another test component 220 that is interested in dynamically created entities as part of performing test scenarios in the DSUT could use the following pseudo-code:

```
ITaskManager = ITaskManagerFactory.CreateTaskManager("DSTS/
EntityActivity");
Task task = ITaskManager.GetTaskForProcessing(
        <another-test-component-identification-guid>,
        Regex("Entity*"),
        true,
        0,
        defaultWaitForTaskTimeout);
```

-continued
```
    if (null != task)
    {
        {PERFORM THE TASK}
        ITaskManager.SetTaskResults(
            <another-test-component-identification-guid>,
            task.identification,
                null);
    }
```

Other test components 220 (the consumer test component) receive any available task for execution in its priority order. The task name is identified by a pattern that is matched against the logical name of the task. The consumer test component also specifies the amount of time it is willing to wait in order to receive the task. The producer test component can retrieve the task results or cancel the initial task if the timeout for processing the task has expired. Task cancellation implies that the producer test component is not interested in the task result, not necessarily that the consumer test component(s) performing the task at the time of cancellation should stop their processing.

An exemplary interface provided by producer/consumer interface 255 is presented below, in pseudo-code form.

```
namespace ProducerConsumerService
{
    // Interface providing identification of producer or consumer entities.
    public interface IIdentification
    {
        // Identification of producer or consumer entities.
        Guid Identification { get; }
    }
    // Task priority accepted values.
    public enum TaskPriority
    {
        Low,
        Medium,
        High
    }
    // Task description class
    public class Task
    {
        public string taskType;
        public Guid identification = Guid.NewGuid( );
        public TaskPriority priority = TaskPriority.Medium;
        public Guid producer = Guid.Empty;
        public Guid consumer = Guid.Empty;
        public List<Task> results = new List<Task>( );
        public Dictionary<string, object> bag =
            new Dictionary<string, object>( );
    }
    // Producer interface.
    public interface IProducer : IIdentification
    {
        void Produce( );
    }
    // Consumer interface.
    public interface IConsumer : IIdentification
    {
        void Consume( );
    }
    // Task manager interface.
    public interface ITaskManager
    {
    // Called by a consumer. Obtains the first task in priority order for
    processing with the right task type.
        /* out */Task GetTaskForProcessing(
            /* in */ Guid consumer,
            /* in */ Regex taskType,
            /* in */ bool matchTaskType,
            /* in */ int retryCount,
            /* in */ int timeout);
```

-continued
```
    // Called by a consumer test component to specify the task
    execution results of a previously acquired task.
        void SetTaskResults(
            /* in */ Guid consumer,
            /* in */ Guid task,
            /* in */ IList<Task> resultTasks);
    // A producer test component calls this method to submit a task
    for later execution.
    // A task has an expected processing time after which is becomes
    obsolete.
        void AddTask(
            /* in */ Guid producer,
            /* in */ Task task,
            /* in */ int expectedProcessingTime);
    // A producer test component calls this method to retrieve the task
    execution results of a task it previously submitted for other test
    components for processing.
        /* out */ IList<Task> GetTaskResults(
            /* in */ Guid producer,
            /* in */ Guid task,
            /* in */ int retryCount,
            /* in */ int timeoutMilliseconds);
    // A producer test component calls this method to cancel the
    execution of a previously submitted task.
        void CancelTask(/* in */ Guid producer, /* in */ Guid task);
    }
    // Factory interface for creating named task managers.
    public interface ITaskManagerFactory
    {
        /* out */ ITaskManager CreateTaskManager(/* in */ string
    workspaceName);
    }
}
```

Figure 3:
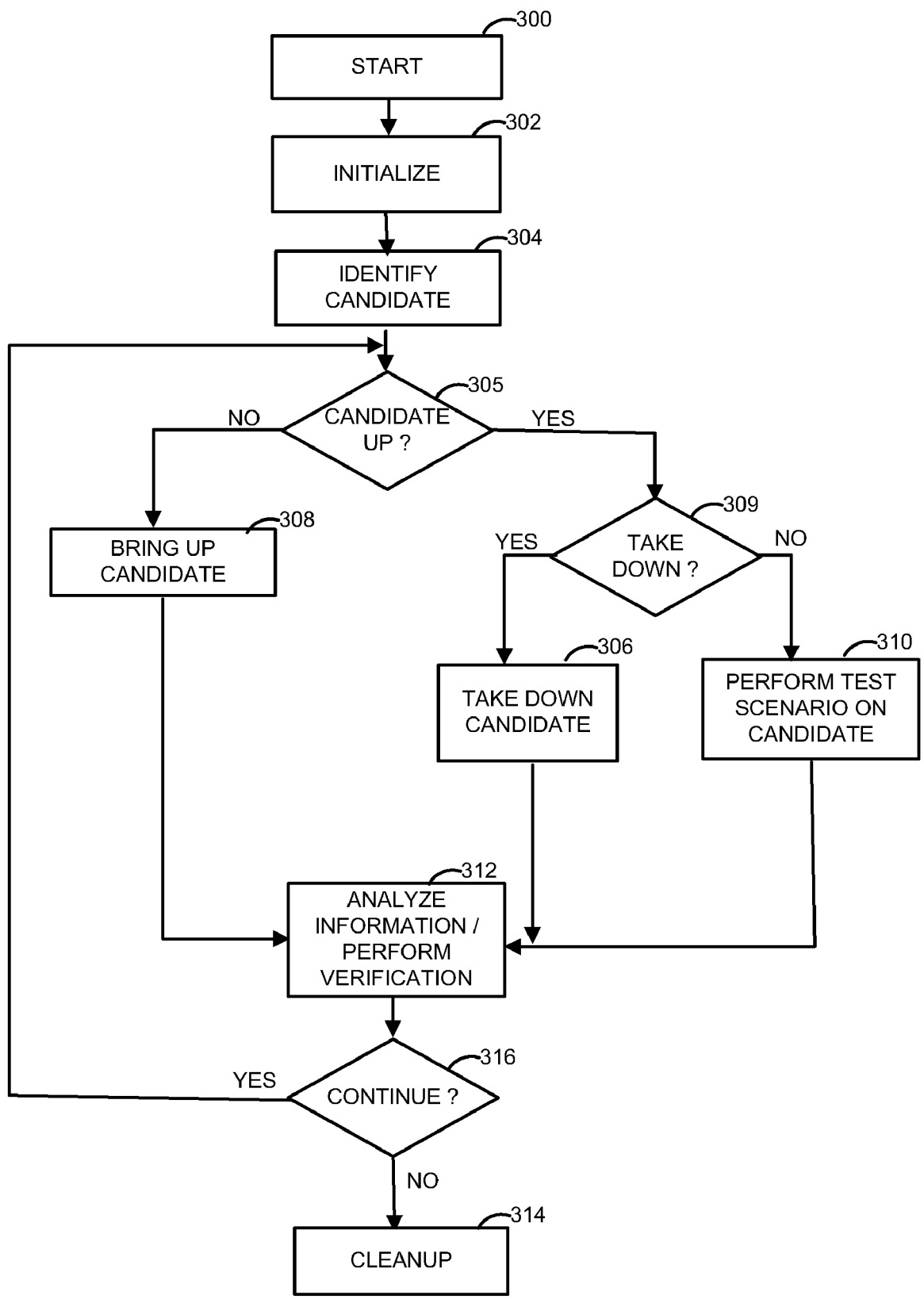
FIG. 3 is a flowchart of a method for testing a distributed computing system using certain aspects of the distributed testing system shown in FIGS. 1 and 2.
Figure 4:
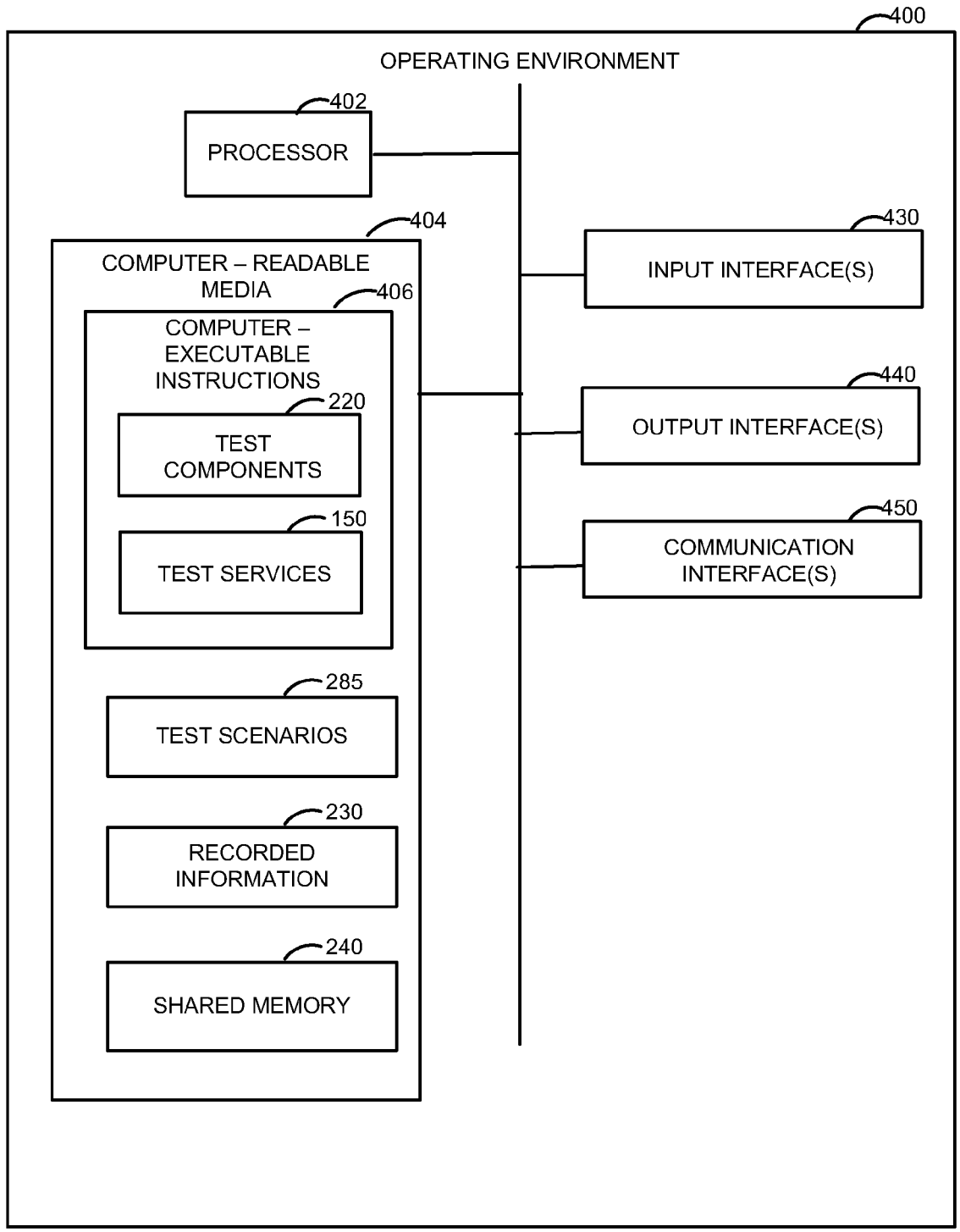
FIG. 4 is a block diagram of a configuration of an operating environment in which aspects of the distributed testing system shown in FIGS. 1 and 2 and/or the method illustrated in FIG. 3 may be implemented or used.

With continuing reference to FIGS. 1 and 2, FIG. 3 is a flowchart of a method for testing a distributed computing system, such as DSUT 100, using a distributed testing system, such as distributed testing system 120. The method illustrated in FIG. 3 may be implemented by computer-executable instructions, such as computer-executable instructions associated with independently executed test components 220, which are stored in a computer-readable medium (such as computer-readable medium 404 shown and discussed in connection with FIG. 4) and executed by one or more general, multi-purpose, or single-purpose processors (such as processor 402, shown and discussed in connection with FIG. 4). Unless specifically stated, the method is not constrained to a particular order or sequence. In addition, some of the method steps may occur or be performed concurrently.

Exemplary method steps performed independently by test components 220 are initially described in general terms, then an exemplary distributed coordinated test execution is explained in more detail. The exemplary test execution is based on a DSUT having N nodes, with M copies of the same test component being used, each test component copy running to perform the steps of FIG. 3 on a particular node, with M<=N. One extra node has a suite of test services 150 installed thereon. It is assumed that the test components execute test scenarios operative to run against nodes of DSUT 100, although the generic method is applicable to perform test scenarios against any system component of DSUT 100, including but not limited to processes, service-providing entities, and resources, which, as described in connection with FIG. 1, are uniquely addressable (for example, via names or ids or any other suitable direct or indirect addressing technique). It is also assumed that test components 220 compute the list(s) of system components that are most likely up and/or down based on the initial states of such system components and on the notifications of subscribed-to events received via publication/subscription service 253. It is further assumed that termination of the method will occur when a desired quantity of test scenarios have been executed against a desired number of system components of DSUT 100.

Referring now to FIG. 3, the method begins at block 300 and continues at block 302, where test components running against the DSUT are initialized/synchronized. With respect to the exemplary distributed coordinated test execution, test components 220 each initialize local data structures, including a variable that holds information (for example, a name and an address) of the node of DSUT 100 that was last taken down by a particular test component, and a list of all nodes in DSUT 100 and their states. Test components 220 contact distributed shared memory service 254, to create/join a common test log. Atomic synchronization service 251 is contacted by test components 220, to create/join a synchronization point which, when reached, indicates when all the test components are known to be successfully initialized. If at least one test component fails initialization, all the test components can know that fact, and may choose to continue or shut down, depending on the distributed test scenario. The synchronization is atomic, and execution of the test components may be aborted (and the test failed, if desired.) Lock manager service 252 is contacted by test components 220, to obtain the lock manager that contains the lock workspace used by a particular distributed test scenario. Within the lock workspace, all service-providing entities used by the particular distributed test scenario can be created and acquired by the test components part of that test scenario. Finally, test components 220 contact publication/subscription service 253, to create a topic that will contain "node down" and "node up" events. A particular test component is free to published and subscribe to this topic through its own local handler; based on this topic, a particular test component is able to maintain an approximately up-to-date copy of the nodes not taken down by any other test component.

Again referring to FIG. 3, at block 304, test components 220 independently identify candidate system components of DSUT 100 for take-down. At diamond 305, it is determined whether a particular candidate is currently up. If a particular candidate is down, the candidate is brought up, as indicated at block 308. If the particular candidate is up, it is determined at diamond 309 whether the candidate should be taken down. It is generally a random decision, based on chance, whether the candidate is taken down, as indicated at block 306, or whether a distributed test scenario is performed on the candidate, as indicated at block 310. With respect to the exemplary distributed coordinated test execution, a particular test component 220 independently contacts lock manager service 252 prior to taking down a node, to acquire an exclusive lock on that node (to ensure that the node to be taken down has not been chosen for take-down by any other test component, and is not being used for test scenario execution by any other test component.) The exemplary test coordination algorithm discussed above in connection with lock manager service 252 may be utilized to lock nodes in exclusive mode or shared mode: if a node is used for test scenario execution, it is locked in shared mode; if a node is chosen to be taken down, it is locked in exclusive mode. Once an exclusive lock is obtained by a particular test component for a particular node, the test component applies fault-injection methods to take down the node. Once a shared lock is obtained, the test component may start performing workload against that node, along with others holding the same shared lock.

Test components 220 independently re-start taken-down nodes, based on node identifying information (the node's name and/or address, for example) stored in local states. Once a particular node is successfully re-started, the test component releases the exclusive lock it has on the node. In addition, a "node up" event may be published to the topic 270 managed by publication/subscription service 253. Upon receiving notification of the subscribed-to event, other test components may adjust their lists of nodes that are online.

Referring to block 310, a test scenario is generally performed against a different system component than the candidate system component. With respect to the exemplary distributed coordinated test execution, test components 220 select nodes against which test scenarios are to be performed. Lock manager service 252 is contacted to lock the selected nodes in shared mode, so that the selected nodes may be accessed by other components for performing test scenarios.

At block 312, information is analyzed and performance/behavior is verified, including but not limited to test components analyzing information associated with performance of their respective distributed test scenarios, and making pass/fail determinations based on the analysis. At diamond 316 it is decided whether to continue or not. If it is decided to continue, the method returns to diamond 305, and if it is decided not to continue, then cleanup-related actions are taken by the test components, as indicated at block 314. With respect to the exemplary distributed coordinated test execution, test components 220 independently clean up local data structures, contact distributed shared memory service 254 to flush the test log of any outstanding events, and exit the test scenario (generally with a pass/fail decision).

In this manner, a fully distributed testing system is described, which achieves dynamic and adaptive coordination amongst independent test components at runtime via the use of test services 150. Various logically and hierarchically defined system components of a distributed computing system may be independently examined (and distributed pass/fail determinations made) using the techniques described herein.

With continuing reference to FIGS. 1-3, FIG. 4 is a block diagram of elements of an operating environment 400 in which/with which aspects of DSUT 100 (such as a node), distributed testing system 120 and/or method 300 may be implemented or used. Operating environment 400 is generally indicative of a wide variety of general-purpose or special-purpose computing environments and is not intended to suggest any limitation as to the scope of use or functionality of the system(s) and methods described herein. For example, operating environment 400 may represent a distributed computing network or a portion thereof.

A processor 402, which may be a real or virtual processor, is responsive to computer-readable media 404 and to computer-executable instructions 406.

Computer-readable media 404 represent any number and combination of local or remote devices, in any form, now known or later developed, capable of recording, storing, or transmitting computer-readable data, such as computer-executable instructions. In particular, computer-readable media may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of CD or DVD); a bubble memory; a cache memory; a core memory; a holographic memory; a memory stick; a paper tape; a punch card; or any combination thereof. Computer-readable media 404 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 406 represent any signal processing methods or stored instructions. Generally, computer-executable instructions 406 are implemented as software components according to well-known practices for component-based software development, and encoded in computer-readable media. Computer programs may be combined or distributed in various ways. Computer-executable instructions 406 are not limited to implementation by any specific embodiments of computer programs, and in other instances may be implemented by, or executed in, hardware, software, firmware, or any combination thereof.

Input interface(s) 430 provide input to operating environment 400. Input may be collected using any type of now known or later-developed interface, including but not limited to a user interface. Output interface(s) 440 provide output from operating environment 400. Output may be provided via any type of now known or later-developed interface, including but not limited to a user interface. Elements of control and/or display associated with user interfaces include but are not limited to: remote controls, displays, mice, pens, styluses, trackballs, keyboards, microphones, scanning devices, printers, speakers, drives, and the like. Communication interface(s) 450 are available to enhance the ability of operating environment 400 to receive information from, or to transmit information to, another physical or logical entity via a communication medium such as a channel signal, a data signal, or a computer-readable medium.

Exemplary configurations of distributed testing system 120 and components thereof have been described. It will be understood, however, that distributed testing system 120 may include fewer, more, or different components or functions than those described herein.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method for testing a distributed computing system using a plurality of test components, the distributed computing system having a plurality of nodes independently and concurrently operable to perform a plurality of processes, a first node configured to perform a first process and a second node configured to perform a second process, the method comprising:

setting up a plurality of test services on one or more of the plurality of nodes;

setting up a first test component on the first node;

setting up a second test component on the second node, the first and second test components comprising independently and concurrently executable computer programs;

at runtime of the distributed computing system, independently executing the first and second test component to call a first test service, the first test service facilitating initialization of the first and second test components;

based on an initialization status of either the first test component or the second test component or both, determining whether to perform a test of the distributed computing system;

when it is determined to perform the test, executing the first test component to call a second test service, the second test service facilitating identification of either the first process or the second process as a first process-under-test;

when it is determined to perform the test, independently executing the second test component to call the second test service to facilitate identification of either the first process or the second process as a second process-under-test;

executing the first test component to perform a first test scenario against the first process-under-test and to record first information associated with the execution of the first test scenario;

independently executing the second test component to perform a second test scenario against the second process-under-test and to record second information associated with the execution of the second test scenario;

executing the first test component to analyze the recorded first information to verify performance of the first process-under-test or the distributed computing system or both; and independently executing the second test component to analyze the recorded second information to verify performance of the second process-under-test or the distributed computing system or both.

2. The method according to claim 1, wherein the step of setting up the plurality of test services comprises setting up one or more test services on one or more nodes selected from the group comprising: the first node; second node; and one or more different nodes of the plurality of nodes.

3. The method according to claim 1, wherein the second test service comprises a publication/subscription service to which the first and second test components publish events associated with a particular topic and subscribe to receive notifications of event occurrences associated with the particular topic.

4. The method according to claim 3, wherein the steps of executing the first and second test components to call the second test service comprise identifying a testing topic implemented by the second test service, subscribing to receive notifications of event occurrences associated with the testing topic, observing the first and second processes-under-test based on the received notifications of event occurrences associated with the testing topic, and based on the step of observing, controlling first and second processes-under-test.

5. The method according to claim 1, wherein the second test service comprises a lock manager service operable to accept lock requests from the first and second test components and based on the lock requests ensure that a distributed system component is not accessed by more than a predetermined maximum number of test components of the plurality of test components, the distributed system component selected from a group of entities having a predefined hierarchy within the distributed computing system, the group comprising: a particular process of the plurality of processes; a particular node of the plurality of nodes; a particular resource associated with a particular process or a particular node; and a particular service-providing entity associated with a particular process or a particular node, and the steps of executing the first and second test components to call the lock manager service comprise identifying a candidate distributed system component, the candidate distributed system component selected from the group of hierarchically-defined entities, sending a lock request message associated with the candidate distributed system component to the lock manager service, receiving from the lock manager service a lock response message associated with the candidate distributed system component, and based on the lock response message, identifying the candidate distributed system component, the lock manager service facilitating dynamic coordination of the plurality of independent test components at runtime of the distributed computing system, via the predefined hierarchy.

6. The method according to claim 5, wherein the lock response message indicates either a lock success or a lock failure, and wherein when the lock response message indicates a lock success the method further comprises:

calling a publication/subscription service to which the first and second test components publish events associated with a particular topic and subscribe to receive notifications of event occurrences associated with the particular topic, identifying a testing topic implemented by the publication/subscription service, and publishing an event to the testing topic, the event associated with the lock success, the published event configured to trigger the publication/subscription service to transmit a corresponding notification of event occurrence, the testing topic facilitating coordination of the plurality of test components, the coordination comprising dynamic coordination or adaptive coordination or both.

7. The method according to claim 1, wherein the method further comprises, prior to the steps of executing the first and second test components to perform the first and second test scenarios, respectively:

executing the first test component to apply fault injection techniques to take down the first process-under-test or a first node-under-test of the plurality of nodes or both;

independently executing the second test component to apply fault injection techniques to take down the second process-under-test or a second node-under-test of the plurality of nodes or both;

after taking down the first process-under-test or the first node-under-test or both, executing the first test component to re-start the first process-under-test or the first node or both; and after taking down the second process-under-test or the second node-under-test or both, independently executing the second test component to re-start the second process-under-test or the second node-under-test or both.

8. The method according to claim 1, wherein the first and second processes are configured to expose one or more service-providing entities from a predetermined group of service-providing entities, the dynamic creation, storage, and destruction of the one or more service-providing entities managed via interaction between the plurality of test components and the distributed computing system.

9. The method according to claim 8, further comprising:

identifying the one or more service-providing entities exposed by the first process-under-test;

identifying the one or more service-providing entities exposed by the second process-under-test;

prior to executing the first test component to perform the first test scenario against the first process-under-test, executing the first test component to call a third test service, passing to the third test service the identified one or more service-providing entities exposed by the first process-under-test; and prior to executing the second component to perform the second test scenario against the second process-under-test, independently executing the second test component to call the third test service, and passing thereto the identified one or more service-providing entities exposed by the second process-under-test.

10. The method according to claim 9, wherein the third test service comprises a feature of the first test service or the second test service.

11. The method according to claim 9, wherein the third test service stores a current global distributed system view of the distributed computing system based on the calls from the first test component and the second test component, and wherein the current global distributed system view is stored in a memory shared by the first test component and the second test component.

12. The method according to claim 11, further comprising, after the steps of executing the first and second test components to analyze:

based on the current global system view stored in the memory, ascertaining a distributed pass/fail determination of the distributed computing system.

13. The method according to claim 11, wherein the global distributed system view is inconsistent, and wherein the third test service performs a computation to ascertain one or more consistent snapshots of the inconsistent global view.

14. The method according to claim 11, wherein the steps of executing the first and second test component to analyze further comprise:

executing the first test component to call the third test service to identify an aspect of the current global distributed system view;

executing the first test component to analyze the recorded first information based on the aspect of the current global distributed system view identified by the first test component;

independently executing the second test component to call the third test service to identify an aspect of the current global distributed system view; and independently executing the second test component to analyze the recorded second information based on the aspect of the current global distributed system view identified by the second test component.

15. The method according to claim 9, wherein the third test service comprises a producer/consumer service, operable to facilitate visibility of the one or more service-providing entities to the plurality of test components, store information about the one or more service-providing entities exposed by the first process-under-test and the second process-under-test during execution of the first and second test scenarios, coordinate test scenarios via tasks that can be submitted via the producer/consumer service as test scenario starting points or test scenario results or both, and guarantee existence of the stored information until the tasks are completed or canceled.

16. The method according to claim 1, wherein the method further comprises, after the steps of executing the first and second test components to analyze, repeatedly performing the steps of independently executing the first and second test components to call the second test service;

independently executing the first and second test components to perform the first and second test scenarios, respectively, and to record first and second information, respectively; and independently executing the first and second test components to analyze the recorded first and second information.

17. A distributed testing system for testing performance of a distributed computing system, the distributed computing system having a plurality of nodes independently and concurrently operable to perform a plurality of processes, a first node configured to perform a first process and a second node configured to perform a second process, the distributed testing system comprising:

a first test component comprising a first instance of a computer program configured for execution on the first node;

a second test component comprising a second instance of the computer program configured for independent and concurrent execution on the second node;

a plurality of test services configured for execution on one or more of the plurality of nodes and independently accessible via execution of the first test component and the second test component, the plurality of test services including a first test service configured to accept calls from, and return initialization information to, the first test component and the second test component, the returned initialization information facilitating independent initialization of the first test component and the second test component, a second test service configured to receive calls from, and return process status information to, the first test component and the second test component, the process status information facilitating identification of either the first process or the second process as a process-under-test, and a third test service configured to receive calls from the first test component and the second test component, the calls identifying one or more service-providing entities exposed by the processes-under-test, the third test service configured to host tasks associated with the one or more identified service-providing entities; and a memory independently accessible by the first test component, the second test component, and one or more of the plurality of test services, the memory storing a global distributed system view based on the calls to the third test service.

18. The distributed testing system according to claim 17, wherein the first test component and the second test component comprise a single computer program inserted at two different nodes during runtime of the distributed computing system.

* * * * *